United States Patent [19]

Tanabe

[11] Patent Number: 4,665,465

[45] Date of Patent: May 12, 1987

[54] FEED-THROUGH TYPE MULTILAYER CAPACITOR

[75] Inventor: Takeshi Tanabe, Fukui, Japan

[73] Assignee: Murata Manufacturing Co., Ltd., Japan

[21] Appl. No.: 823,588

[22] Filed: Jan. 29, 1986

[30] Foreign Application Priority Data

Jan. 30, 1985 [JP] Japan .............................. 60-12644[U]

[51] Int. Cl.$^4$ .......................... H01G 1/14; H01G 4/10
[52] U.S. Cl. ..................................... 361/306; 361/321
[58] Field of Search .............................. 361/302–304, 361/306, 308–310, 320–323, 328

[56] References Cited

U.S. PATENT DOCUMENTS

| | | | |
|---|---|---|---|
| 3,694,710 | 9/1972 | Kirschner | 361/321 |
| 4,193,106 | 3/1980 | Coleman | 361/321 X |
| 4,356,529 | 10/1982 | Kopel | 361/304 |
| 4,590,537 | 5/1986 | Sakamoto | 361/306 |

Primary Examiner—Donald A. Griffin
Attorney, Agent, or Firm—Ostrolenk, Faber, Gerb & Soffen

[57] ABSTRACT

A feed-through type multilayer capacitor having a layered structure in which two dielectric sheets, each having a through electrode of approximately constant width formed on its outer surface, are disposed so as to have the same direction of said through electrode; and additional dielectric sheets having earth electrodes thereon are formed respectively on the top side and the bottom side of the dielectric sheets having through electrodes, so that said earth electrodes formed on the outer surfaces of these dielectric sheets will cross said through electrodes, with the result that the respective crossing portions of each through electrode and each earth electrode oppositely face each other with the dielectric sheet therebetween, to form electrostatic capacitance.

7 Claims, 18 Drawing Figures

FEED-THROUGH TYPE MULTILAYER CAPACITOR

BACKGROUND OF THE INVENTION

The present invention relates to a feed-through type multilayer capacitor having a through electrode and an earth electrode on the outer surfaces of dielectric sheets to be laminated to form one block of layered structure.

As shown in a perspective view, a longitudinally sectional view and an exploded perspective view of FIG. 1, FIG. 2 and FIG. 3, respectively, a conventional feed-through type multilayer capacitor has been constructed by laminating a first dielectric sheet 2 provided with a through electrode 1 thereon, a pair of second dielectric sheets 4, 6 provided with earth electrodes 3, 5 thereon, and an insulating sheet 7; and providing terminals 9, 10, 11 for the electrodes 1, 3, 5 on the outer surface of the sheets; thereby forming one block 8 of square pillar type having approximately constant dimensions. The pair of second dielectric sheets 4, 6 is laminated on the top and bottom faces of the first dielectric sheet 2 respectively such that the earth electrodes 3, 5 are placed traversely in a direction orthogonal to the line of the through electrode 1, and the insulating sheet 7 is mounted on the top face of the second dielectric sheet 4. Accordingly, sheets 7, 4, 2, 6 are laminated in that order to form a feed-through type multilayer capacitor comprising one block 8 providing with a pair of through electrode terminals 9, 10 of cover type connected with the through electrode 1 on opposite sides of the block 8 and an earth electrode terminal 11 connected with a pair of earth electrodes 3, 5, the terminal 11 having the form of a ring around the intermediate portion of the block 8. Thus, an electrostatic capacitance is provided between the through electrode 1 and earth electrodes 3, 5, which are arranged transverse to each other and sandwich the corresponding dielectric sheet 4 or 2 therebetween in the direction of thickness. Both ends of the through electrode 1 are respectively drawn out to the through electrode terminals 9, 10 formed on both the end faces of the block 8 of the dielectric sheets 2, 4, 6 and the insulating sheet 7. The earth electrodes 3, 5 are drawn out to the earth electrode terminal 11 formed between these through electrode terminals 9, 10. The electrostatic capacitance is formed between the earth electrodes 3, 5 and a crossing portion 12 of the through electrode 1 disposed between the earth electrodes 3, 5.

In a feed-through type multilayer capacitor of such construction as described hereinabove, the thickness of the through electrode 1 is normally as extremely thin as several $\mu$m and the resistance value R of the through electrode 1 connected between the through electrode terminals 9 and 10 becomes high. Therefore, when the energizing current of the through electrode 1 becomes large, the through electrode 1 is heated and becomes high enough to melt the solder, which is used to solder the through electrode terminals 9, 10 of the feed-through type multilayer capacitor and the earth electrode terminal 11 thereof, to the patterns of the printed circuit board (not shown). The repeated heating operation causes stress among the through electrode terminals 9, 10, the earth electrode terminal 11 and the other portions so as to cause cracks in the dielectric sheets 2, 4, 6 or the insulating sheets 7.

SUMMARY OF THE INVENTION

Accordingly, an important object of the present invention is to provide an improved feed-through type multilayer capacitor, which is free from the above-described problems of a conventional capacitor, and can handle larger energization current in the through electrode while exhibiting less heating.

Another important object of the present invention is to provide a feed-through type multilayer capacitor of the above-described type which has less electric field concentration applied to an electrode provided on the outer surface of the dielectric sheet to be laminated to form one block having a layered structure, thereby to improve the withstand voltage characteristics thereof.

In accomplishing these and other objects, according to the present invention, there is provided a feed-through type multilayer capacitor where through electrodes are formed respectively on two dielectric sheets. As these through electrodes are connected at the ends to each other and in parallel relation, the resistance values between both ends of the through electrodes become smaller.

BRIEF DESCRIPTION OF THE DRAWINGS

These and other objects and features of the present invention will become apparent from the following description of preferred embodiments thereof with reference to the accompanying drawings, in which.

DETAILED DESCRIPTION OF EMBODIMENTS OF THE INVENTION

Figure 1:
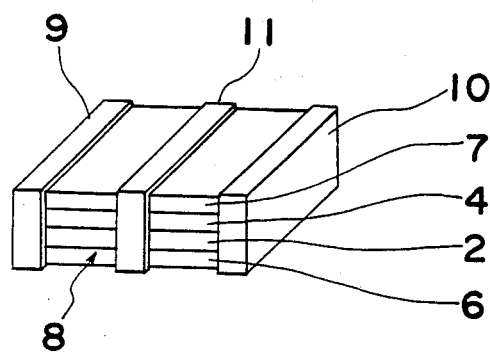
FIG. 1 is a perspective view of a conventional feed-through type multilayer capacitor (already referred to)

Before the description embodiments of the present invention proceeds, it is to be noted that like parts are designated by like reference numerals throughout the accompanying drawings.

Figure 2:
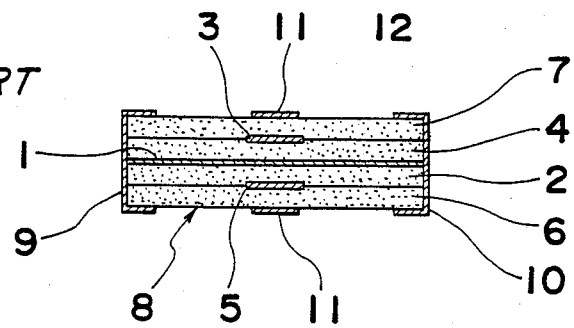
FIG. 2 is a longitudinal sectional view of the capacitor of FIG. 1.
Figure 3:
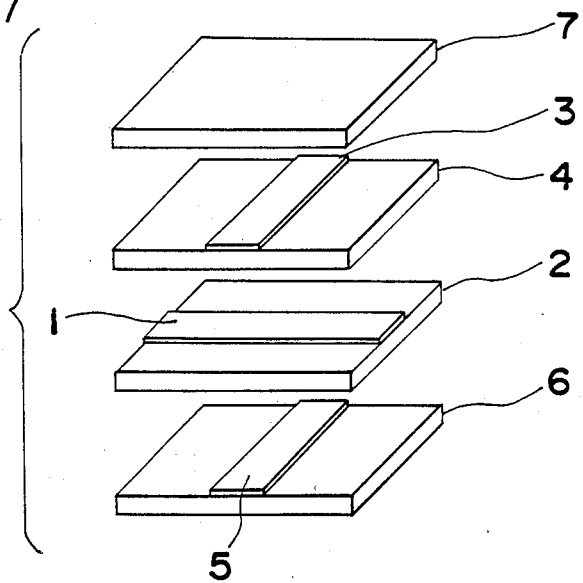
FIG. 3 is an exploded perspective view of the capacitor of FIG. 1.
Figure 4:
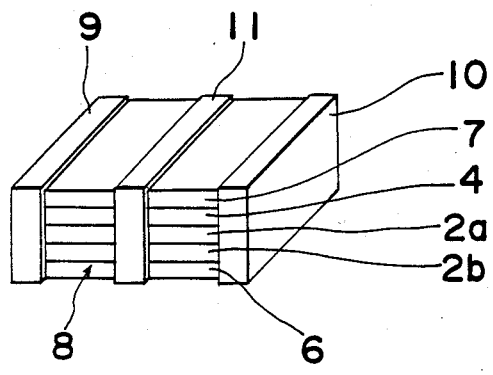
FIG. 4 is a perspective view of a feed-through type multiplayer capacitor according to a first embodiment of the present invention.
Figure 5:
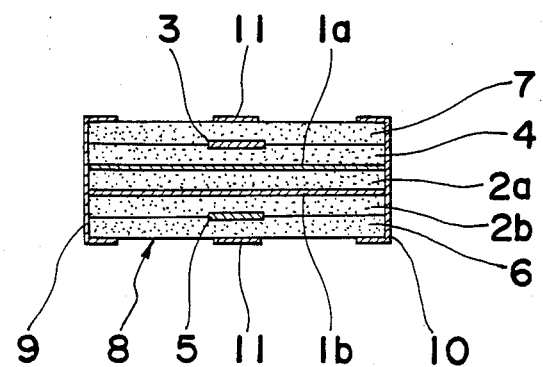
FIG. 5 is a longitudinal sectional view of the capacitor of FIG. 4.
Figure 6:
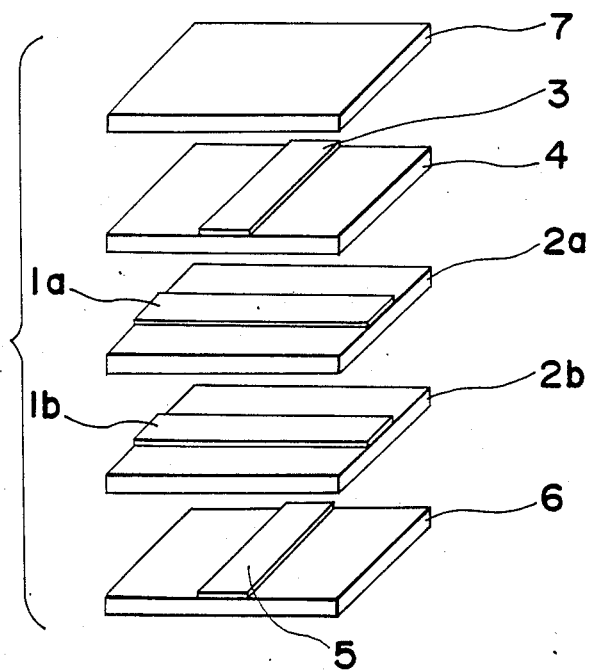
FIG. 6 is an exploded perspective view of the capacitor of FIG. 4.

Referring now to the drawings, there is shown in FIG. 4, FIG. 5 and FIG. 6, according to a first embodiment of the present invention, a feed-through type multilayer capacitor comprising, in combination, a pair of dielectric sheets 2a, 2b having through electrodes 1a, 1b, a pair of dielectric sheets 4, 6 having earth electrodes 3, 5, an insulating sheet 7, and terminals 9, 10, 11 connected with said through electrodes 1a, 1b and earth electrodes 3, 5. The sheets are laminated in piling up as one block 8 in order of 7, 4, 2a, 2b, 6 from top to bottom. The through electrodes 1a, 1b are placed in a direction approximately orthogonal to the earth electrodes 3, 5 and the terminals 9, 10, 11 are provided on the outer surface of the block 8. The capacitor has the pair of dielectric sheets 2a, 2b provided with the through electrodes 1a, 1b thereon to be placed in parallel to each other and disposed between the pair of dielectric sheets 4 and 6, which are corresponding to the sheets 4, 6 of the conventional feed-through type multilayer capacitor described in FIGS. 1 to 3. Thus, a pair of electrostatic capacitances are provided between the earth electrodes 3, 5 and crossing portions of the through electrodes 1a, 1b disposed between the earth electrodes 3, 5. The dielectric sheet 2a has a through electrode 1a formed on its major face, while the dielectric sheet 2b has a through electrode 1b formed on its major face. Both ends of the through electrode 1a are respectively connected with Kthrough electrode terminals 9, 10. Both ends of the through electrode 1b are respectively connected with through electrode terminals 9, 10. Accordingly, the inside electrodes of the capacitor disposed within the block 8 consist of two pairs of through electrodes and earth electrodes, while the outside electrodes disposed on the outer surface of the block 8 consist of a pair of through electrode terminals connected to the pair of through electrodes and one earth electrode terminal connected to the pair of earth electrodes. When a current flowing between the through electrode terminals 9, 10 is equal to that of the conventional feed-through type multilayer capacitor, the calorific value of the first embodiment of the present invention is one half that of the conventional one. When the calorific value is one half, thermal stress which is applied to the dielectric sheets 2a, 2b, 4, 6 and an insulating sheet 7 of the first embodiment is reduced to prevent cracks from being caused.

Figure 14:
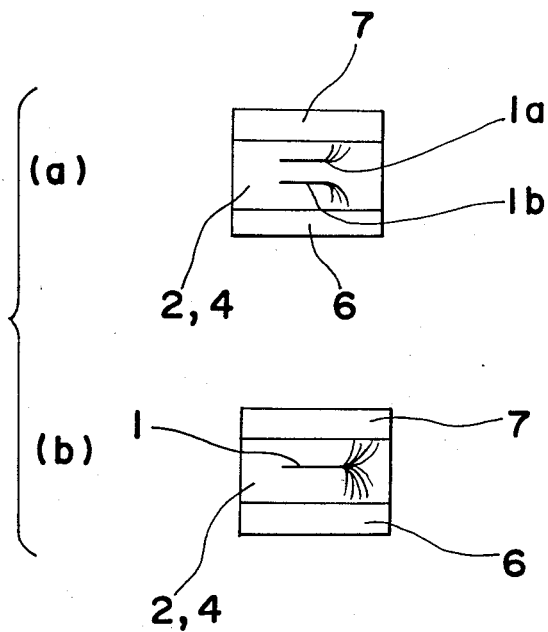
FIG. 14(a) is a simplified longitudinal sectional view of a capacitor according to the present invention.
FIG. 14(b) shows a simplified longitudinal sectional view of the conventional capacitor for comparison to the one of FIG. 14(a)

FIG. 14(a) is a simplified longitudinal sectional view of a capacitor in accordance with the present invention. FIG. 14(b) shows a simplified longitudinal sectional view of the conventional capacitor for comparison therebetween. In the conventional capacitor, the electric field is concentrated on one electrode to cause the withstand-voltage characteristics to deteriorate. In the capacitor of the present invention, the electric-field concentration is divided between two electrodes and is thereby halved, thus doubling the withstand-voltage characteristics of the capacitor.

Figure 7:
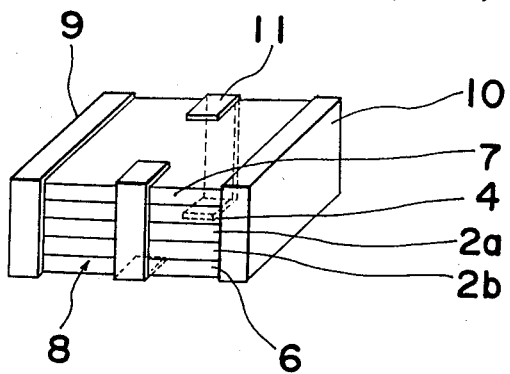
FIGS. 7 through 9 show a second embodiment of the present invention.
Figure 8:
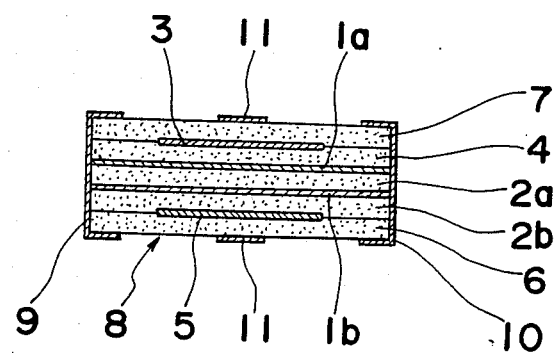
Figure 9:
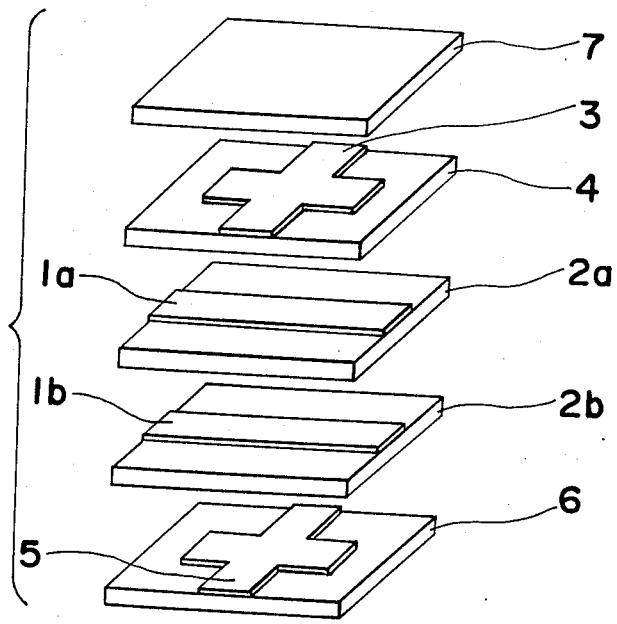

FIGS. 7 through 9 show a second embodiment of the present invention, wherein the pattern of the electrode 3, 5 is formed in the shape of a cross to increase the area of the electrode, the external terminal of the earth is halved by the top, bottom faces of the unit. Also, the outside terminal 11 of earth electrodes disposed on the outer surface of the block 8 is divided in two by cutting off the central portions thereof disposed on the outer surface of the insulating sheet 7 and dielectric sheet 6 in order to reduce the area amount of the outside terminal 11 facing directly to the earth electrodes 3, 5 of the sheets 7, 6 through the sheets 7, 6, thereby to render to improve the characteristic of withstand voltage of the capacitor.

Figure 10:
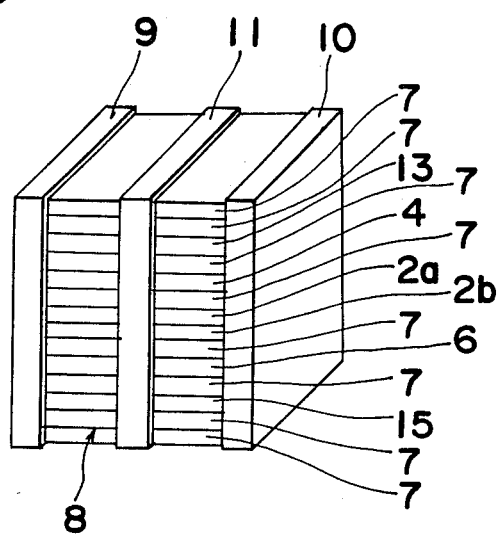
FIGS. 10 through 12 show a third embodiment thereof.
Figure 11:
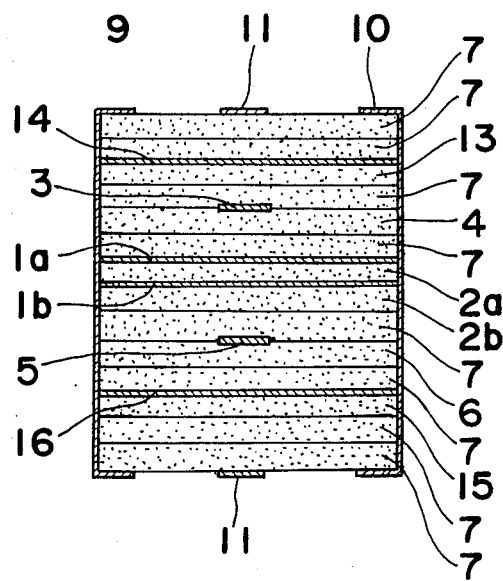
Figure 12:
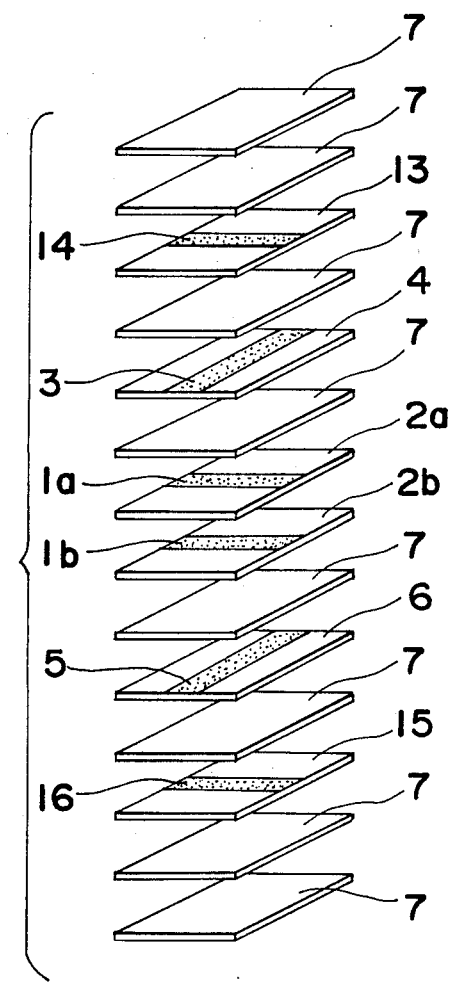

FIGS. 10 through 12 show, according to a third embodiment of the present invention, a feed-through type multilayer capacitor comprising, in combination of, a pair of dielectric sheets 2a, 2b having through electrodes 1a, 1b, a pair of dielectric sheets 4, 6 having earth electrodes 3, 5, a further pair of dielectric sheets 13, 15 having through electrodes 14, 16, fours pairs of insulating sheets 7, and terminals 9, 10, 11 connected with said through electrodes 1a, 1b, 14, 16 and earth electrodes 3, 5, the sheets being laminated in piling up in order of 7, 7, 13, 7, 4, 7, 2a, 2b, 7, 6, 7, 15, 7, 7 from top to below to form one block 8 and providing the terminals 9, 10, 11 on the outer surface of the block 8. Each one of insulating sheets 7 is inserted between each pair of dielectric sheets 13 and 4, 4 and 2a, 2b and 6, 6 and 15, and each sets of two insulating sheets 7 are provided at outsides of the top and below dielectric sheets 13, 15, thereby to render to improve the characteristic of withstand voltage of the capacitances. The capacitor has the pair of dielectric sheets 2a, 2b both disposed between the pair of dielectric sheets 4, 6 under placing the through electrodes 1a, 1b of the dielectric sheets 2a, 2b in parallel with each other but in a direction orthogonal to the earth electrodes 3, 5 of the dielectric sheets 4, 6 in order to provide a pair of electrostatic capacitances among the earth electrodes 3, 5 and crossing portions of the through electrodes 1a, 1b disposed between the earth electrodes 3, 5. Also, the capacitor has the further pair of dielectric sheets 13, 15 each disposed between the corresponding dielectric sheet 4 or 6 of earth electrode 3 or 5 having an insulating sheet 7 and the pair of insulating sheets 7, 7 disposed at the outside of the further pair of dielectric sheets 13, 15 on which the outer surface is provided with the terminals 9, 10, 11 under placing the through electrodes 14, 16 of the further dielectric sheets 13, 15 in parallel to the through electrodes 1a, 1b of the dielectric sheets 2a, 2b, the pair of terminals 9, 10 for through electrodes being connected to the both sides of the through electrodes 1a, 1b 14, 16 of the dielectric sheets 2a, 2b and the further dielectric sheets 13, 15, in order to provide a pair of further electrostatic capacitances among the earth electrodes 3, 5, terminal 11 and crossing portions of the through electrodes 14, 16 disposed between the earth electrodes 3, 5 and terminal 11. Accordingly, with the above arrangement having electrostatic capacitances, the electrostatic capacitances and current capacity thereof can be increased in amount in comparison with those of the first embodiment. It is to be noted that, in the various capacitors, since the electrostatic capacitance to be formed between the through electrode 14 or 16 and the terminal 11 is obtained through a plurality of insulating sheets 7, the electrostatic capacitance becomes extremely small in the practical use without causing troubles of withstand voltage thereof. The insulating sheets provided between the dielectric sheets and, also, at the outsides of the dielectric sheets 13, 15 may be omitted except for one disposed at the outside of the further dielectric sheet 13 or can be replaced merely by dielectric sheets having no electrode thereon, in accordance with the characteristic of withstand voltage of the capacitor.

Figure 13:
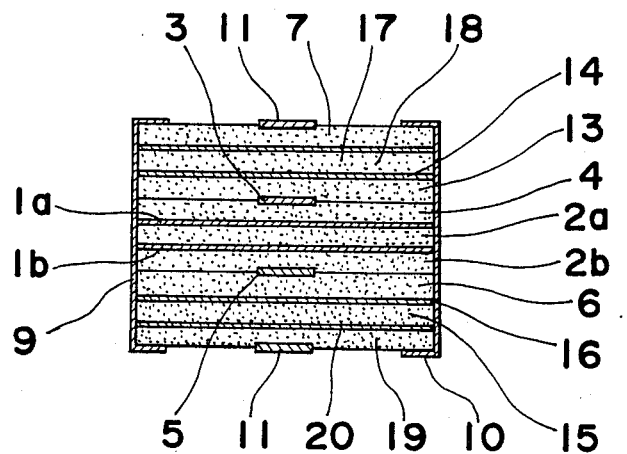
FIG. 13 shows a modified example of the third embodiment.

FIG. 13 shows a modified example of the third embodiment, wherein two dielectric line sheets 13, 18 or 15, 19 having through electrodes 14, 17 or 16, 20 are interposed between the earth electrode 3 or 5 of the dielectric sheets 4 or 6 and the external terminal 11 to assemble layers of nine in all to ensure the withstand voltage of the through electrode 14 or 16 of the further dielectric sheet 13 or 15. Therefore, the desired object may be achieved by the simple construction. Accordingly, in the third embodiment the dielectric sheets 18, 19 having through electrodes 17, 20 thereon are added as to form a couple with the dielectric sheets 13, 15 having through electrodes 14, 16 of the second embodiment, thereby to render to improve the characteristic of withstand voltage of the capacitor.

Figure 15:
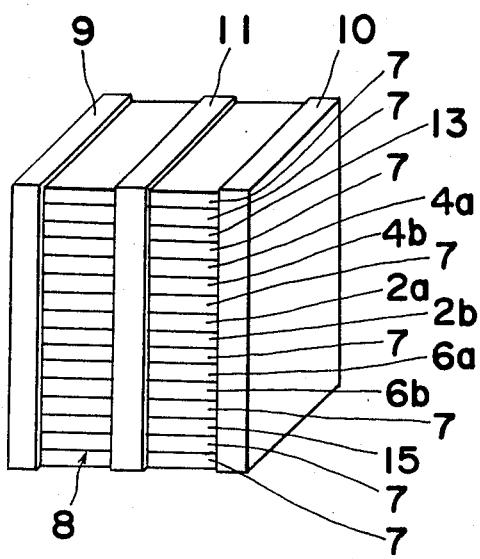
FIGS. 15 through 17 show a fourth embodiment of the present invention.
Figure 16:
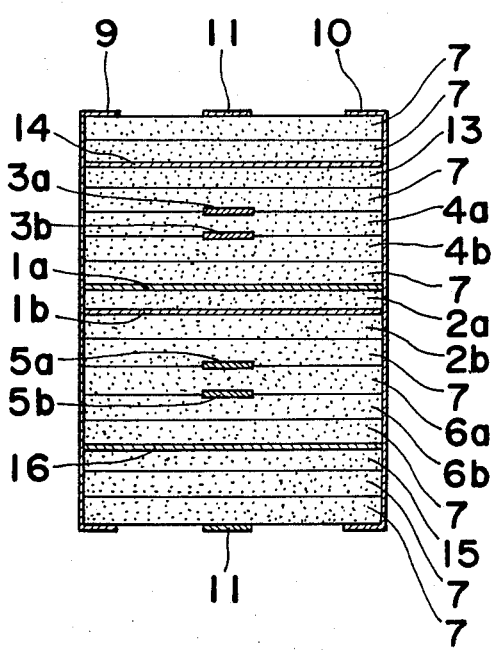
Figure 17:
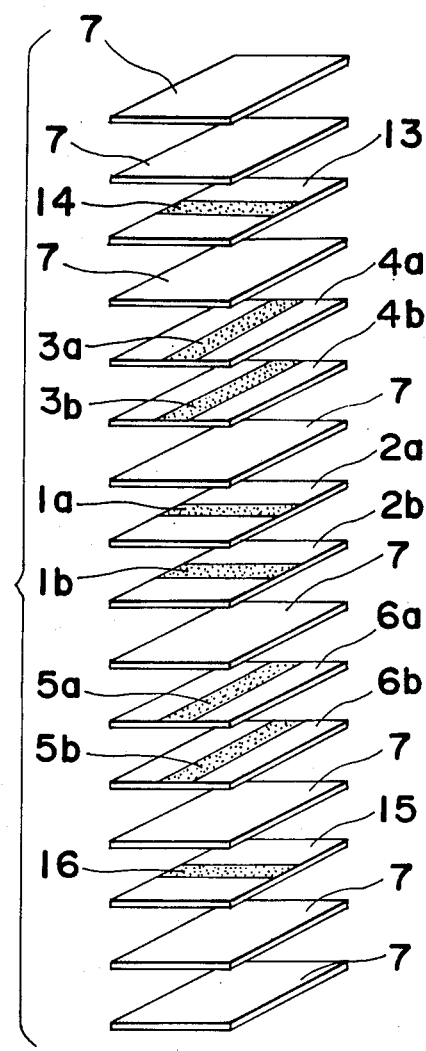

FIGS. 15 through 17 show a feed-through type multilayer capacitor of the fourth embodiment of the present invention, wherein there provide a pair of dielectric sheets 4a, 4b and 6a, 6b having earth electrodes 3a, 3b and 5a, 5b in place of each one of the dielectric sheets 4, 6 having earth electrodes 3, 5 in the second embodiment of FIGS. 10 through 12 in order to make an enforcement of withstand voltage of the capacitor for use in high voltage. In the fourth embodiment, sixteen sheets are laminated in piling up in order of 7, 7, 13, 7, 4a, 4b, 7, 2a, 2b, 7, 6a, 6b, 7, 15, 7, 7, from top to below to form one unit, and three terminals 9, 10, 11 are provided on the outer surface of the block 8. In other words, the pair of earth electrodes are provided as well as the through electrodes in order to eliminate the problem of withstand voltage to be raised in the third embodiment.

Figure 18:
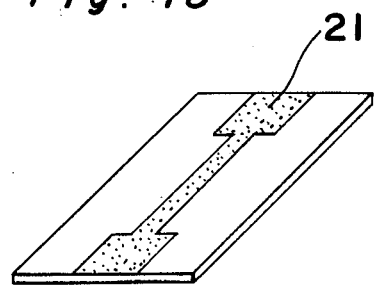
FIG. 18 shows a modified example of the fourth embodiment.

FIG. 18 shows a modified example of pattern for an electrode 21 to be provided on the dielectric sheet of the capacity and having a front view of I-shape in order to ensure the connection of the through electrode.

In addition, there may be easily provided a feed-through multilayer capacitor of the construction having a pair of earth electrodes and a pair of through electrodes in combination of capacitors of the third and fourth embodiments.

According to the present invention, through type electrodes are formed respectively in two dielectric sheets in a feed-through type multilayer capacitor so that these through electrodes are adapted to be connected in parallel. Therefore, the sectional area of the through electrode becomes larger and the resistance value becomes lower. Accordingly, according to the present invention, the energization current may be doubled and the heating may be almost halved as compared with the conventional one. In addition, the reduction in the calorific value prevents the repeated heating and cooling operations from causing cracks or the like in the dielectric sheets. Also, the electric field concentration on the electrode can be almost halved to improve the withstand voltage characteristics.

Although embodiments of the present invention have been described by way of example with reference to the accompanying drawings, it is to be noted here that various changes and modifications will be apparent to those skilled in the art. Therefore, unless such changes and modifications depart from the scope of the present invention, as defined in the claims, they should be construed as being included therein.

What is claimed is:

1. A feed-through type multilayer capacitor comprising, in combination,
    a pair of first dielectric sheets having through electrodes formed thereon,
    a pair of second dielectric sheets having earth electrodes formed thereon,
    an insulating sheet, and
    a plurality of terminals, each being connected with one of said through electrodes and earth electrodes, all the sheets being laminated and piled up to form one block in such an order that the first dielectric sheets are sandwiched between the second dielectric sheets and the insulating sheet is disposed at the outside of the dielectric sheet block, the through electrodes being disposed in a direction orthogonal to the earth electrodes and the terminals being provided on the outer surface of the block, thereby to provide a pair of electrostatic capacitances between the earth electrodes and crossing portions of the through electrodes disposed between the earth electrodes;
    wherein the electrodes of the capacitor disposed within the block comprise two pairs of the through electrodes and earth electrodes, and the electrodes disposed on the outer surface of the block comprise a pair of through electrode terminals connected to the pair of through electrodes and one earth electrode terminal connected to the pair of earth electrodes.

2. A feed-through type multilayer capacitor as defined in claim 1, wherein the outside terminal of earth electrodes disposed on the outer surface of the block is divided in two by cutting out the central portions thereof disposed on the outer surface of the insulating sheet, and dielectric sheet in order to reduce the area amount of the outside terminal facing directly the earth electrode of the sheets and through the sheets, thereby improve the characteristic of withstand voltage of the capacitor.

3. A feed-through type multilayer capacitor as defined in claim 1, wherein at least one insulating sheet is inserted between each pair of dielectric sheets, thereby to improve the characteristic of withstand voltage of the capacitor.

4. A feed-through type multilayer capacitor as defined in claim 1, wherein at least one dielectric sheet with no electrode thereon is inserted between each pair of dielectric sheets, thereby to improve the characteristic of withstand voltage of the capacitor.

5. A feed-through type multilayer capacitor as defined in claim 1, wherein another pair of dielectric sheets having through electrodes are provided, each one being disposed at the outside of the dielectric sheet having earth electrode.

6. A feed-through type multilayer capacitor as defined in claim 1, wherein two sets each including another pair of dielectric sheets having through electrodes are provided, each set being disposed at the outside of the dielectric sheets having earth electrodes.

7. A feed-through type multilayer capacitor as in claim 1, further comprising another pair of dielectric sheets having earth electrodes, each one being disposed at the outside of a dielectric sheet having earth electrodes.

* * * * *